(12) United States Patent  
Jang et al.

(10) Patent No.: US 11,777,075 B2
(45) Date of Patent: Oct. 3, 2023

(54) POSITIVE ACTIVE MATERIAL FOR RECHARGEABLE LITHIUM BATTERY, PREPARING METHOD THEREOF AND RECHARGEABLE LITHIUM BATTERY COMPRISING POSITIVE ELECTRODE INCLUDING POSITIVE ACTIVE MATERIAL

(71) Applicant: Samsung SDI Co., Ltd., Yongin-si (KR)

(72) Inventors: Jungsue Jang, Yongin-si (KR); Jinhwa Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 78 days.

(21) Appl. No.: 17/529,172

(22) Filed: Nov. 17, 2021

(65) Prior Publication Data
US 2022/0077450 A1    Mar. 10, 2022

Related U.S. Application Data

(60) Continuation-in-part of application No. 17/073,124, filed on Oct. 16, 2020, which is a division of (Continued)

(30) Foreign Application Priority Data

Dec. 4, 2017  (KR) .................. 10-2017-0165431
Dec. 3, 2018  (KR) .................. 10-2018-0153649
May 28, 2021 (KR) .................. 10-2021-0069175

(51) Int. Cl.
*H01M 4/131* (2010.01)
*H01M 4/525* (2010.01)
(Continued)

(52) U.S. Cl.
CPC ......... *H01M 4/131* (2013.01); *H01M 4/0471* (2013.01); *H01M 4/1391* (2013.01);
(Continued)

(58) Field of Classification Search
CPC .. H01M 4/131; H01M 4/0471; H01M 4/1391; H01M 4/364; H01M 4/505; H01M 4/525; H01M 10/0525; H01M 2004/028
See application file for complete search history.

(56) References Cited

U.S. PATENT DOCUMENTS 6,589,499 B2   7/2003  Gao et al.
10,056,605 B2  8/2018  Oh et al.
(Continued)

FOREIGN PATENT DOCUMENTS

CN   101167209 A   4/2008
CN   101714630 A   5/2010
(Continued)

OTHER PUBLICATIONS

Notice of Allowance for U.S. Appl. No. 17/073,124 dated Aug. 5, 2022, 5 pages.
(Continued)

*Primary Examiner* — Matthew J Merkling
(74) *Attorney, Agent, or Firm* — Lewis Roca Rothgerber Christie LLP

(57) ABSTRACT

A positive active material for a rechargeable lithium battery, a preparing method thereof, and a rechargeable lithium battery including the same are provided. The positive active material includes: a first positive active material in a form of secondary particles in which a plurality of primary particles are aggregated, wherein at least a portion of the primary particles have a radially arranged structure, and a second positive active material having a monolithic structure, wherein both the first positive active material and the second (Continued)

positive active material are nickel-based positive active materials, each of the first positive active material and the second positive active material is coated with cobalt, and a maximum roughness of the surface of the second positive active material is greater than or equal to about 15 nm.

9 Claims, 7 Drawing Sheets

Related U.S. Application Data application No. 16/209,659, filed on Dec. 4, 2018, now Pat. No. 10,847,781.

(51) Int. Cl.
| | | |
|---|---|---|
| *H01M 10/0525* | (2010.01) | |
| *H01M 4/04* | (2006.01) | |
| *H01M 4/505* | (2010.01) | |
| *H01M 4/1391* | (2010.01) | |
| *H01M 4/36* | (2006.01) | |
| *H01M 4/02* | (2006.01) | |

(52) U.S. Cl.
CPC ............ *H01M 4/364* (2013.01); *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | |
|---|---|---|---|
| 2004/0058243 A1 | 3/2004 | Ohzuku et al. | |
| 2007/0122705 A1 | 5/2007 | Paulsen et al. | |
| 2008/0026292 A1 | 1/2008 | Paulsen et al. | |
| 2008/0248391 A1 | 10/2008 | Wakasugi et al. | |
| 2009/0029253 A1 | 1/2009 | Itou et al. | |
| 2009/0258296 A1 | 10/2009 | Kawasato et al. | |
| 2010/0081055 A1 | 4/2010 | Konishi et al. | |
| 2011/0079752 A1 | 4/2011 | Park et al. | |
| 2011/0226986 A1 | 9/2011 | Wang et al. | |
| 2011/0240913 A1 | 10/2011 | Kim et al. | |
| 2012/0085967 A1 | 4/2012 | Yokoyama et al. | |
| 2012/0100429 A1 | 4/2012 | Sueki et al. | |
| 2012/0261610 A1 | 10/2012 | Paulsen et al. | |
| 2013/0316237 A1 | 11/2013 | Miki | |
| 2014/0106212 A1 | 4/2014 | Choi et al. | |
| 2014/0131633 A1 | 5/2014 | Ito et al. | |
| 2014/0205906 A1 | 7/2014 | Kudo et al. | |
| 2014/0212759 A1 | 7/2014 | Blangero et al. | |
| 2015/0010819 A1 | 1/2015 | Lee et al. | |
| 2015/0064577 A1 | 3/2015 | Natsui et al. | |
| 2015/0093580 A1 | 4/2015 | Kobayashi et al. | |
| 2015/0228971 A1 | 8/2015 | Kim et al. | |
| 2015/0340686 A1 | 11/2015 | Sun et al. | |
| 2016/0156020 A1 | 6/2016 | Tokoro et al. | |
| 2016/0301069 A1 | 10/2016 | Kwak et al. | |
| 2016/0380263 A1 | 12/2016 | Nakayama et al. | |
| 2017/0222211 A1 | 8/2017 | Ryu et al. | |
| 2017/0222225 A1 | 8/2017 | Kang et al. | |
| 2017/0309910 A1 | 10/2017 | Jo et al. | |
| 2017/0317342 A1 | 11/2017 | Kang et al. | |
| 2017/0358799 A1 | 12/2017 | Gunji et al. | |
| 2018/0026268 A1 | 1/2018 | Kim et al. | |
| 2018/0048015 A1 | 2/2018 | Lee et al. | |
| 2018/0108940 A1 | 4/2018 | Kwon et al. | |
| 2018/0151876 A1 | 5/2018 | Kim et al. | |
| 2018/0248180 A1 | 8/2018 | Liu et al. | |
| 2018/0261842 A1 | 9/2018 | Park et al. | |
| 2018/0316005 A1 | 11/2018 | Shin et al. | |
| 2019/0020024 A1 | 1/2019 | Wang et al. | |
| 2019/0044127 A1 | 2/2019 | Kim | |
| 2019/0173076 A1 | 6/2019 | Kim et al. | |
| 2019/0296349 A1* | 9/2019 | Cho | H01M 4/62 |
| 2019/0355981 A1 | 11/2019 | Chang et al. | |
| 2020/0127276 A1 | 4/2020 | Kim et al. | |
| 2020/0185714 A1 | 6/2020 | Han et al. | |
| 2020/0295368 A1 | 9/2020 | Kong et al. | |
| 2022/0029147 A1 | 1/2022 | Ogawa et al. | |
| 2022/0059836 A1 | 2/2022 | Hiratsuka et al. | |

FOREIGN PATENT DOCUMENTS

| | | | | |
|---|---|---|---|---|
| CN | 107251282 A | 10/2017 | | |
| CN | 112750999 A | 5/2021 | | |
| EP | 1876664 A1 | 1/2008 | | |
| EP | 2169745 A1 | 3/2010 | | |
| EP | 3425703 B1 | 9/2019 | | |
| EP | 3647269 A1 | 5/2020 | | |
| EP | 3723172 A2 * | 10/2020 | ........... | C01G 53/006 |
| JP | 2001-167761 A | 6/2001 | | |
| JP | 2013-038022 A | 2/2013 | | |
| JP | 2013-120676 A | 6/2013 | | |
| JP | 2015-076397 A | 4/2015 | | |
| JP | 2016-51503 A | 4/2016 | | |
| JP | 2016-76294 A | 5/2016 | | |
| JP | 2018-92931 A | 6/2018 | | |
| JP | 2018-532236 A | 11/2018 | | |
| JP | 6544951 B2 | 7/2019 | | |
| KR | 2003-0045853 A | 6/2003 | | |
| KR | 10-2006-0105039 A | 10/2006 | | |
| KR | 10-2009-0032138 A | 3/2009 | | |
| KR | 10-2010-0130522 A | 12/2010 | | |
| KR | 10-2011-0109879 A | 10/2011 | | |
| KR | 10-1154880 B1 | 6/2012 | | |
| KR | 10-1244050 B1 | 3/2013 | | |
| KR | 10-2014-0025597 A | 3/2014 | | |
| KR | 10-1452950 B1 | 10/2014 | | |
| KR | 10-1593401 B1 | 2/2016 | | |
| KR | 10-1595322 B1 | 2/2016 | | |
| KR | 10-1604509 B1 | 3/2016 | | |
| KR | 10-2016-0049519 | 5/2016 | | |
| KR | 10-2016-0129764 A | 11/2016 | | |
| KR | 10-2017-0063408 A | 6/2017 | | |
| KR | 10-2017-0093085 A | 8/2017 | | |
| KR | 10-1785262 B1 | 10/2017 | | |
| KR | 10-2018-0059736 A | 6/2018 | | |
| KR | 10-2018-0121267 A | 11/2018 | | |
| KR | 10-2019-0006906 A | 1/2019 | | |
| KR | 10-2019-0065963 A | 6/2019 | | |
| KR | 10-1989399 B1 | 6/2019 | | |
| KR | 10-2020-0043612 A | 4/2020 | | |
| KR | 10-2020-0070649 A | 6/2020 | | |
| KR | 10-2144056 B1 | 8/2020 | | |
| KR | 10-2020-0110027 A | 9/2020 | | |
| KR | 10-2175126 B1 | 11/2020 | | |
| WO | WO 2015/053580 A1 | 4/2015 | | |
| WO | WO 2016/129629 A1 | 8/2016 | | |
| WO | 2020/137296 A1 | 7/2020 | | |

OTHER PUBLICATIONS

Notice of Allowance for U.S. Appl. No. 17/102,332 dated Aug. 17, 2022, 8 pages.
U.S. Office Action dated Nov. 29, 2022, issued in U.S. Appl. No. 17/186,502 (10 pages).
Japanese Office Action dated Dec. 5, 2022, issued in Japanese Patent Application No. 2021-184817 (6 pages).
Korean Office Action from Application No. 10-2020-0124255, dated Feb. 23, 2022, 7 pages.
U.S. Notice of Allowance from U.S. Appl. No. 17/073,124, dated Feb. 8, 2022, 8 pages.
Advisory Action for U.S. Appl. No. 17/102,332 dated Jun. 7, 2022, 3 pages.
Notice of Allowance for U.S. Appl. No. 17/102,412 dated Jul. 13, 2022, 5 pages.
EPO Extended European Search Report dated Jan. 3, 2023, issued in European Patent Application No. 22189038.7 (9 pages).
U.S. Office Action dated Oct. 20, 2021, issued in U.S. Appl. No. 17/073,124 (7 pages).
EPO Extended European Search Report dated Oct. 15, 2021, issued in European Patent Application No. 21170242.8 (10 pages).

(56) References Cited

OTHER PUBLICATIONS

Li, Guangxin, et al, "Ultrathin Li—Si—O Coating Layer to Stabilize the Surface Structure and Prolong the Cycling Life of Single-Crystal LiNi0.6Co0.2Mn0.2O2 Cathode Materials at 4.5 V," ACS Applied Materials & Interfaces, vol. 13, Feb. 2021, pp. 10952-10963, XP055954371.
EPO Extended European Search Report dated Sep. 2, 2022, issued in European Patent Application No. 22165926.1 (10 pages).
U.S. Restriction Requirement dated Sep. 23, 2022, issued in U.S. Appl. No. 17/186,502 (6 pages).
U.S. Notice of Allowance dated Feb. 1, 2023, issued in U.S. Appl. No. 17/073,124 (5 pages).
U.S. Notice of Allowance dated Feb. 1, 2023, issued in U.S. Appl. No. 17/102,332 (5 pages).
U.S. Notice of Allowance dated Mar. 22, 2023, issued in U.S. Appl. No. 17/186,502 (9 pages).
Chinese Office Action, with English translation, dated Nov. 19, 2021, issued in corresponding Chinese Patent Application No. 201880077888.5 (22 pages).
U.S. Notice of Allowance dated Dec. 8, 2021, issued in U.S. Appl. No. 17/102,412 (10 pages).
U.S. Office Action dated Dec. 14, 2021, issued in U.S. Appl. No. 17/102,332 (9 pages).
U.S. Notice of Allowance from U.S. Appl. No. 16/209,659, dated Jul. 17, 2020, 8 pages.
U.S. Restriction Requirement from U.S. Appl. No. 16/209,659, dated Mar. 27, 2020, 5 pages.
Kim, Yongseon et al., "First-principles and experimental investigation of the morphology of layer-structured $LiNiO_2$ and $LiCoO_2$", Journal of Materials Chemistry, 2012, vol. 22, pp. 12874-12881.
Korean Office Action dated May 21, 2020, for corresponding Korean Patent Application No. 10-2018-0153649 (6 pages).
Korean Intellectual Property Office Notice of Allowance for corresponding Korean Patent Application No. 10-2018-0153649, dated Sep. 22, 2020, 5 pages.
Duan, Jianguo et al., "Enhanced compacting density and cycling performance of Ni-riched electrode via building mono dispersed micron scaled morphology", Journal of Alloys and Compounds, vol. 695 (2017) pp. 91-99.
International Search Report and Written Opinion for patent application No. PCT/KR2018/015220, dated May 24, 2019, 10 pages.
Sun, Yang-Kook, et al., "Synthesis and Characterization of $Li[(Ni_{0.8}Co_{0.1}Mn_{0.1})_{0.8}(Ni_{0.5}Mn_{0.5})_{0.2}]O_2$ with the Microscale Core-Shell Structure as the Positive Electrode Material for Lithium Batteries," J. Am. Chem. Soc., vol. 127, 2005, 8 pages.
EPO Extended European Search Report dated Jul. 23, 2021, issued in corresponding European Patent Application No. 18885458.2 (7 pages).
Notice of Allowance for related U.S. Appl. No. 17/102,412, dated Mar. 24, 2022 (5 pages).
Final Office Action for U.S. Appl. No. 17/102,332 dated Apr. 11, 2022, 7 pages.
Notice of Allowance for U.S. Appl. No. 17/073,124 dated Apr. 8, 2022, 5 pages.
Extended European Search Report dated Apr. 8, 2022 for European Patent Application No. 21206169.1, 9 pages.

* cited by examiner (A)            (B)            (C)

POSITIVE ACTIVE MATERIAL FOR RECHARGEABLE LITHIUM BATTERY, PREPARING METHOD THEREOF AND RECHARGEABLE LITHIUM BATTERY COMPRISING POSITIVE ELECTRODE INCLUDING POSITIVE ACTIVE MATERIAL

CROSS-REFERENCE TO RELATED APPLICATION

This application is a continuation-in-part of U.S. patent application Ser. No. 17/073,124 filed in the United States Patent and Trademark Office on Oct. 16, 2020, which is a divisional of U.S. patent application Ser. No. 16/209,659, filed Dec. 4, 2018, now U.S. Pat. No. 10,847,781, which claims priority to and the benefit of Korean Patent Application No. 10-2017-0165431, filed in the Korean Intellectual Property Office on Dec. 4, 2017 and Korean Patent Application No. 10-2018-0153649, filed in the Korean Intellectual Property Office on Dec. 3, 2018, the entire content of each of which is incorporated herein by reference. This application also claims priority to and the benefit of Korean Patent Application No. 10-2021-0069175 filed in the Korean Intellectual Property Office on May 28, 2021, the entire content of which is incorporated herein by reference. This application is related to co-pending U.S. patent application Ser. Nos. 17/102,412 and 17/102,332, each filed in the United States Patent and Trademark Office on Nov. 23, 2020, which are each a continuation-in-part of application Ser. No. 16/209,659, the entire content of each of which is incorporated herein by reference.

BACKGROUND

1. Field

One or more aspects of embodiments of the present disclosure relate to a positive active material for a rechargeable lithium battery, a preparing method thereof, and a rechargeable lithium battery including a positive electrode including the same.

2. Description of the Related Art

As portable electronic devices, communication devices, and/or the like are developed, rechargeable lithium batteries having a high energy density are desired.

A positive active material for a rechargeable lithium battery may be a lithium nickel manganese cobalt composite oxide, a lithium cobalt oxide, and/or the like. When such positive active materials are utilized, the cycle-life of a rechargeable lithium battery may be decreased, resistance may be increased, and capacity characteristics may be insufficient, for example due to cracks generated in the positive active material as charging and discharging are repeated.

SUMMARY

One or more aspects of embodiments of the present disclosure are directed toward a positive active material for a rechargeable lithium battery with improved cycle-life characteristics while implementing a high capacity, a preparing method thereof and a rechargeable lithium battery including the same.

One or more embodiments of the present disclosure provide a positive active material for a rechargeable lithium battery including: a first positive active material in a form of secondary particles in which a plurality of primary particles are aggregated, wherein at least a portion of the primary particles have a radially arranged structure, and a second positive active material having a monolithic structure, wherein both the first positive active material and the second positive active material are (e.g., simultaneously) nickel-based positive active materials, each of the first positive active material and the second positive active material is coated with cobalt (Co), and a maximum roughness of the surface of the second positive active material is greater than or equal to about 15 nm.

One or more embodiments of the present disclosure provide a method of preparing a positive active material for a rechargeable lithium battery including: mixing a first nickel-based hydroxide and a lithium raw material and performing a first heat treatment to prepare a first nickel-based oxide, mixing a second nickel-based hydroxide and lithium raw material and performing a second heat treatment to prepare a second nickel-based oxide, and mixing the first nickel-based oxide, the second nickel-based oxide, and a cobalt compound and performing a third heat treatment to form a cobalt coating, and obtaining a final positive active material including the first positive active material and the second positive active material.

One or more embodiments of the present disclosure provide a rechargeable lithium battery including a positive electrode including the positive active material, a negative electrode, and an electrolyte is provided.

The positive active material for a rechargeable lithium battery manufactured according to an embodiment and a rechargeable lithium battery including the same may exhibit excellent or suitable charge and discharge efficiency and/or cycle-life characteristics while realizing a high capacity and/or high energy density.

DETAILED DESCRIPTION

Figure 1:
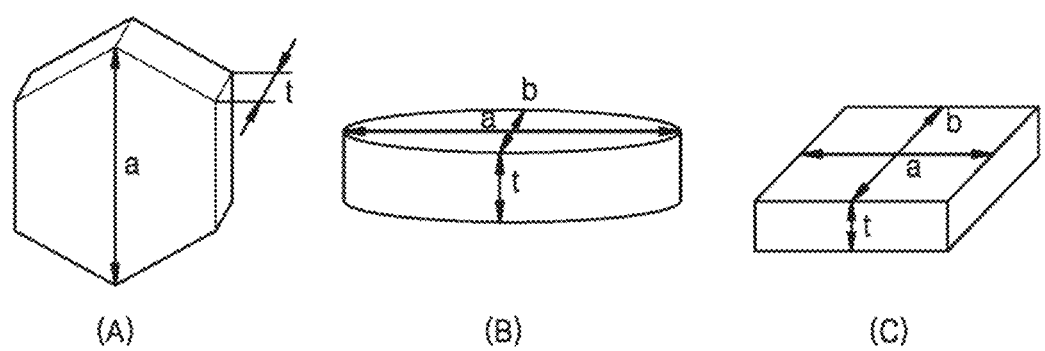
FIG. 1 is a schematic view showing the shape of a plate-shaped primary particle according to an embodiment.

Hereinafter, embodiments of the present disclosure are described in more detail with reference to the accompanying drawings, so that those of ordinary skill in the art to which the present disclosure pertains can easily implement them. As those skilled in the art would realize, the described embodiments may be modified in various suitable different ways, all without departing from the spirit or scope of the present disclosure. The drawings and description are to be regarded as being illustrative in nature and not restrictive.

Like reference numerals designate like elements throughout the specification, and duplicative descriptions thereof may not be provided.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present. Further, the use of "may" when describing embodiments of the present disclosure refers to "one or more embodiments of the present disclosure."

Herein, the average particle diameter and average length may be measured by a method well known to those skilled in the art, and for example, may be measured by a particle size analyzer, or may be measured by a transmission electron micrograph or a scanning electron micrograph. For example, an average particle diameter value may be obtained by measuring particle diameters utilizing a dynamic light scattering method, performing data analysis, counting the number of particles for each particle size range, and calculating from this. Unless otherwise defined, the term "average particle diameter" may refer to the diameter (D50) of particles having a cumulative volume of 50 volume % in a cumulative particle size distribution.

Positive Active Material

In an embodiment, a positive active material for a rechargeable lithium battery includes a first positive active material in a form of secondary particles formed by aggregation of a plurality of primary particles, wherein at least a portion of the primary particles have a radially arranged structure, and a second positive active material having a monolithic structure, wherein both the first positive active material and the second positive active material are nickel-based positive active materials (e.g., simultaneously), each is coated with cobalt (Co) (e.g., a compound including Co), and a maximum roughness of the surface of the second positive active material is greater than or equal to about 15 nm. Such a positive active material may exhibit improved cycle-life characteristics while implementing high capacity and/or high energy density.

First Positive Active Material

The first positive active material includes secondary particles in the form of a polycrystal (e.g., polycrystalline material), in which at least two or more primary particles are aggregated, and at least a portion of the primary particles have a radially arranged structure. At least some of the primary particles may have a plate shape. For example, the primary particles may have a thickness smaller than a long axis length. Here, the term "long axis length" refers to the maximum length of the particle, which is also the widest (e.g., longest) surface of the primary particle. For example, the primary particle may have a structure in which the thickness length (t) in one axial direction (i.e., thickness direction) is smaller than the long axis length (a) in the other direction (i.e., plane direction, which is perpendicular or normal to the thickness direction).

FIG. 1 is a schematic view showing the shape of primary particles of a first positive active material. Referring to FIG. 1, the primary particles according to an embodiment may have various suitable detailed shapes while having a basic plate structure, for example, (A) a polygonal nanoplate shape (such as a hexagon or hexagonal prism), (B) a nanodisk shape, and (C) a rectangular parallelepiped or prismatic shape.

In FIG. 1, "a" refers to the length of the long axis of the primary particle, "b" refers to the length of the short axis, and "t" refers to the thickness (thickness axis). Herein, the length "a" of the long axis may refer to a maximum length of the widest surface of the plate-shaped primary particle, and the length b of the short axis may refer to a minimum length of the widest surface of the plate-shaped primary particle. In the plate-shaped primary particle, a direction in which the thickness "t" is defined may be referred to as a thickness direction, and a direction in the plane containing the length "a" of the long axis and the length "b" of the short axis may be referred to as a plane direction. The thickness "t" of the plate-shaped primary particles may be smaller than the plane direction lengths "a" and "b". Among the plane direction lengths, "a" may be longer than or equal to "b".

The first positive active material may have irregular porous pores (e.g., an irregular porous structure) in the internal portion and external portion of the secondary particles, respectively. The term "irregular porous structure" refers to a structure having pores that are not regular (e.g., highly vary) in pore size and shape, and have no uniformity. The internal portion containing the irregular porous structure may include primary particles like the external portion. The primary particles disposed in the internal portion may be arranged without regularity (e.g., without any set or predetermined pattern), unlike (e.g., in contrast to) the primary particles disposed in the external portion (e.g., which may be arranged in a set or predetermined pattern, as described herein).

The term "external portion" may refer to a region within about 30 length % to about 50 length % (e.g., of the particle radius length) from the outermost surface, for example, within about 40 length % from the outermost surface with respect to a total distance from the center to the surface of the secondary particle, or in some embodiments, may refer to a region within about 2 μm or about 4 μm from the outermost surface of the secondary particle. The term "internal portion" may refer to a region within about 50 length % to about 70 length % (e.g., of the particle radius length) from the particle center, for example, within about 60 length % from the center with respect to a total distance from the center to the surface of the secondary particle, or in some embodiments, a region excluding the region within about 2 μm or about 4 μm from the outermost surface of the secondary particle.

The secondary particles of the first positive active material may have open pores having a size (e.g., length or diameter) of less than about 150 nm, for example, about 10 nm to about 148 nm, extending from the particle surface toward the center of the internal portion. The term "open pore" may refer to an exposed pore (e.g., a pore exposed at the particle surface), into which an electrolyte solution may flow in and out. The open pores may be formed to a depth of less than or equal to about 150 nm, for example, about 0.001 nm to about 100 nm, for example, about 1 nm to about 50 nm on average from the surface of the secondary particles.

Figure 2:
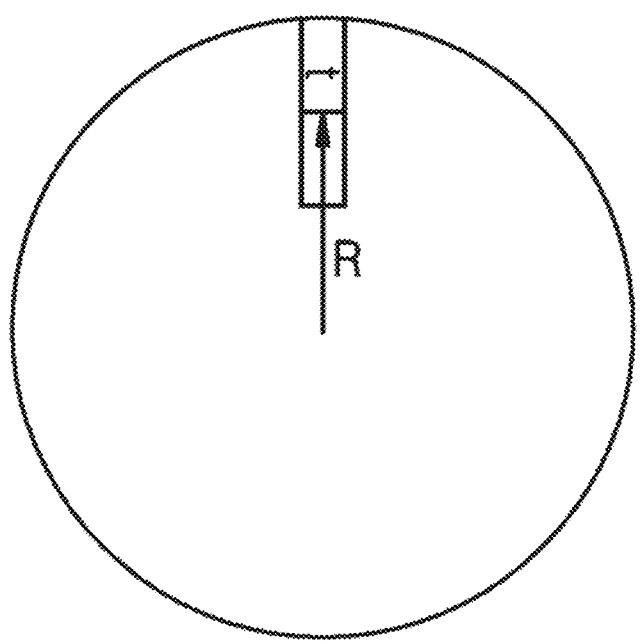
FIG. 2 is a view for explaining the definition of a radial in secondary particles according to an embodiment.

In the first positive active material, at least a portion of the primary particles may have a radially arranged structure, and for example, long axes of the primary particles may be arranged in a radial direction. FIG. 2 is a schematic diagram for explaining the definition of a radial in secondary particles according to an embodiment. In an embodiment, the term "radially arranged structure" refers to an arrangement, as shown in FIG. 2, in which the thickness (t) direction of the primary particles is perpendicular to or within an angle of about ±5° of perpendicular to the direction (R), which extends from the center of the particle toward the surface from the center of the secondary particles.

At least one part (e.g., a portion) of the primary particles may be arranged radially. For example, all or some of the primary particles in a secondary particle may be radially oriented. For example, the secondary particle may include an internal part and an external part, and the primary particles both in the internal part and the external part may be (e.g., simultaneously) radially arranged, or for example, only the primary particles in the external part may be radially arranged. For example, the secondary particle may include an external part in which the primary particles are radially arranged and an internal part in which the primary particles are irregularly arranged.

The average length of the primary particles of the secondary particle may be about 0.01 µm to about 5 µm. For example, the average length may be about 0.01 µm to about 2 µm, about 0.01 µm to about 1 µm, about 0.02 µm to about 1 µm, or about 0.05 µm to about 0.5 µm. Here, the term "average length" refers to the average length of the long axis length (a) in the plane direction when the primary particles are plate-shaped, and refers to the average particle diameter when the primary particle is spherical.

When the primary particles are plate-shaped, an average thickness of the primary particles may be for example greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, or greater than or equal to about 900 nm, and for example, less than or equal to about 5 µm, less than or equal to about 4 µm, less than or equal to about 3 µm, less than or equal to about 2 µm, less than or equal to about 1 µm, less than or equal to about 900 nm, less than or equal to about 800 nm, less than or equal to about 700 nm, less than or equal to about 600 nm, or less than or equal to about 500 nm, for example, the average thickness of the primary particles may be about 100 nm to about 200 nm. In some embodiments, in the primary particle, a ratio of the average thickness to the average length may be about 1:1 to about 1:10, for example about 1:1 to about 1:8, for example about 1:1 to about 1:6.

As described above, when the average length, the average thickness, and the ratio between the average thickness and the average length of the primary particles each satisfy the above ranges, and when the primary particles are radially arranged, it may be possible to have relatively many (e.g., a large or increased number of) lithium diffusion pathways between grain boundaries on the surface side (e.g., at the surface of the secondary particle), and a large number of crystal planes capable of lithium transfer are exposed to the outside, so that lithium diffusion may be improved and high initial efficiency and/or capacity can be secured. When the primary particles are arranged radially, the pores exposed on the surface may be directed toward the center of the secondary particles, thereby promoting diffusion of lithium (e.g., throughout the particle). Due to the radially arranged primary particles, substantially uniform contraction and/or expansion may be possible when lithium is deintercalated and/or intercalated, and when lithium is deintercalated, pores exist in (e.g., are positioned along or parallel to) the (001) direction, which is the direction in which the particles expand, so that the pores act as an expansion buffer. Due to the size and arrangement of the primary particles, the probability of cracks occurring during contraction and expansion of the active material may be lowered, and the internal pores may further alleviate volume changes to reduce generation of cracks between the primary particles during charging and discharging, resulting in improved cycle-life characteristics and/or reduced resistance increase phenomenon.

Closed pores may exist (e.g., be present) in the internal portion of the secondary particle, and closed pores and/or open pores may exist in the external portion. The closed pores may exclude or mostly exclude an electrolyte, while the open pores may include an electrolyte therein. The closed pores are independent pores that are not connected to other pores because all of the walls of the pores are formed in a closed structure, and the open pores are substantially continuous pores connected to the outside of the particle because at least some or a portion of the walls of the pores are formed in an open structure.

Because the positive active material according to an embodiment includes the first positive active material, even when cracks occur, direct contact between the cracked surface and the electrolyte is minimized or reduced, thereby suppressing an increase in surface resistance.

Figure 3:
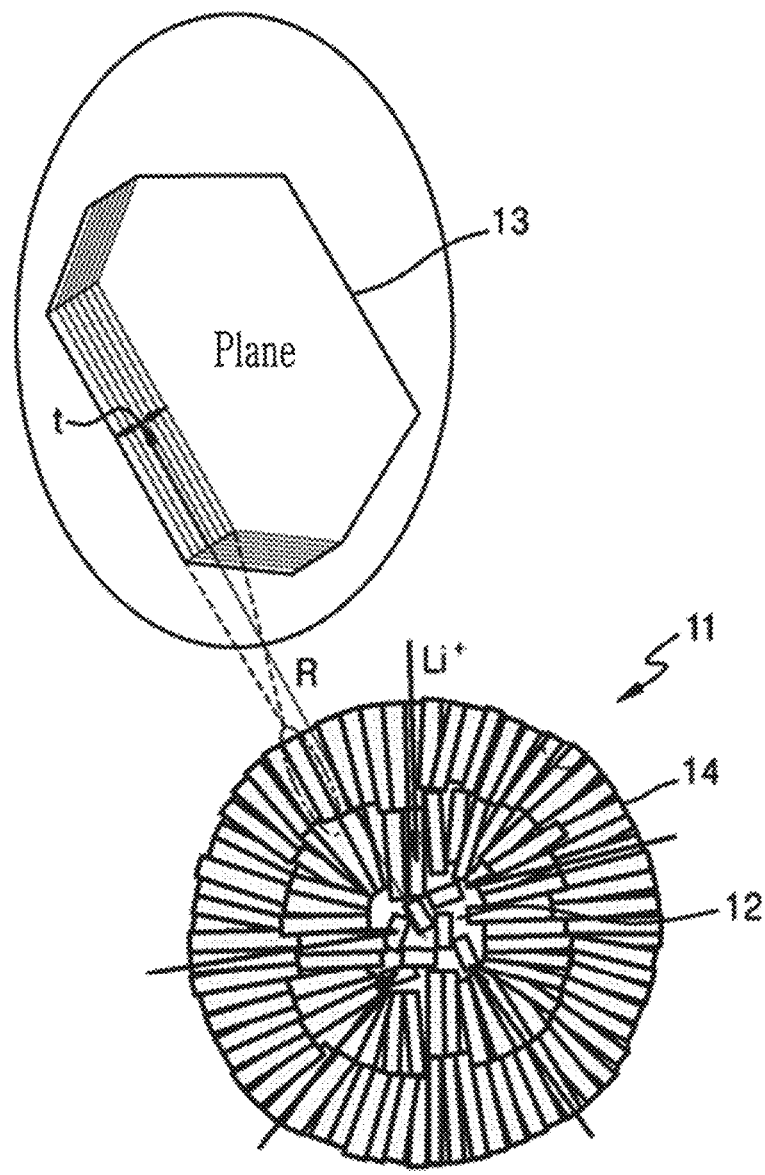
FIG. 3 is a schematic view showing a cross-sectional structure of a secondary particle according to an embodiment.

FIG. 3 is a schematic view illustrating a cross-sectional structure of secondary particles of a first positive active material. Referring to FIG. 3, the secondary particles 11 of the first positive active material according to an embodiment have an external portion 14 having a structure in which the primary particles 13 having a plate shape are arranged in a radial direction, and an internal portion 12 in which the primary articles 13 are irregularly arranged. The internal portion 12 may have more empty spaces between the primary particles than the external portion. In some embodiments, the pore size and porosity in the internal portion may be larger and more irregular, compared with the pore size and porosity in the external portion. In FIG. 3, arrows (e.g., the arrows extending from outside of the secondary particle toward the center of the secondary particle, and/or between layers of the primary particle shown in the inset) indicate the movement direction of lithium ions.

In the secondary particle, the internal portion has a porous structure, so that the diffusion distance of lithium ions to particles in the internal portion is reduced, and the external portion is radially arranged toward the surface, so that lithium ions are easily intercalated into the surface. When the size of the primary particles is relatively small (e.g., within the ranges described herein), it may be easy to secure a lithium transfer path between crystal grains. Because the average size of the primary particles is small and the pores between the primary particles alleviate volume change occurring during charging and discharging, stress caused by the volume change during charging and discharging may be minimized or reduced.

In the secondary particles, the plurality of primary particles may have a radial arrangement structure by being arranged toward the "single (1) center" (e.g., a single center or central point) so that the primary particles make surface contact with each other along the thickness direction of the primary particles. In some embodiments, the secondary particles may have a "multi-center" radial arrangement structure having a plurality of centers. When the secondary particles have a single-center or multi-center radial arrangement structure, lithium is easily deintercalated and/or intercalated to the centers of the secondary particles.

The secondary particles may include radially arranged primary particles and non-radial (e.g., non-radially arranged) primary particles. The content (e.g., amount) of the non-radial primary particles may be less than or equal to about 20 wt %, for example about 0.01 wt % to about 10 wt %, or about 0.1 wt % to about 5 wt %, based on 100 parts by weight of the total weight of the radial primary particles and the non-radial primary particles. When non-radial primary particles are included in the above-described content (e.g., amount) range in addition to the radial primary particles in the secondary particles, a rechargeable lithium battery with improved cycle-life characteristics may be provided by facilitating the diffusion of lithium.

The first positive active material according to an embodiment may be coated with cobalt (e.g., a cobalt-containing coating compound). For example, the secondary particles of the first positive active material may be coated with cobalt on one or more surfaces (e.g., the outer surface of the secondary particle). In other words, the first positive active material may include the secondary particles, and cobalt-coating layers on surfaces of the secondary particles. When the first positive active material is coated with cobalt, structural collapse of the particles as a result of repetitive charges and discharges may be effectively suppressed or reduced, and accordingly, room temperature and/or high temperature cycle-life characteristics may be improved.

Herein, the cobalt coating may be expressed by coating a cobalt-containing compound. The cobalt-containing compound may, for example, include a cobalt oxide, a cobalt hydroxide, a cobalt carbonate, a combined compound thereof, a mixture thereof, and/or the like, which may further include lithium, nickel, and/or the like.

The amount of cobalt coating (e.g., the amount of cobalt) in the first positive active material may be about 0.01 mol % to about 7 mol %, for example, about 0.01 mol % to about 6 mol %, about 0.01 mol % to about 5 mol %, about 0.1 mol % to about 4 mol %, about 0.1 mol % to about 3 mol %, or about 0.5 mol % to about 3 mol %, and may also be (e.g., with respect to the concentration of cobalt atoms) about 0.01 atom % to about 7 atom %, about 0.1 atom % to about 5 atom %, or about 0.5 atom % to about 3 atom % based on the total amount of the first positive active material. In this case, the rechargeable lithium battery including the first positive active material may implement excellent or suitable room temperature and/or high temperature cycle-life characteristics.

The thickness of the cobalt coating layer in the first positive active material may vary depending on the firing temperature during coating, and in some embodiments, cobalt may penetrate into the active material and be coated and/or doped according to the firing temperature. Accordingly, the thickness of the cobalt coating layer may be, for example, about 1 nm to about 2 μm, about 1 nm to about 1.5 μm, about 1 nm to about 1 μm, about 1 nm to about 900 nm, about 1 nm to about 700 nm, about 1 nm to about 500 nm, about 1 nm to about 300 nm, about 5 nm to about 100 nm, or about 5 nm to about 50 nm. In this case, the rechargeable lithium battery including the first positive active material may exhibit excellent or suitable room temperature and high temperature cycle-life characteristics. The cobalt coating layer may include a coated portion and a doped portion.

The average particle diameter of the first positive active material, that is, the average particle diameter of the secondary particles may be about 7 μm to about 25 μm. For example, it may be about 9 μm to about 25 μm, about 9 μm to about 25 μm, about 15 μm to about 25 μm, or about 10 μm to about 20 μm. The average particle diameter of the secondary particles of the first positive active material may be equal to or larger than the average particle diameter of the second positive active material, which will be described later. The positive active material according to an embodiment may be in the form of a mixture of a first positive active material, which is polycrystalline and is in the form of large particles, and a second positive active material, which has a monolithic structure and is in the form of small particles, thereby improving a mixture density, and providing high capacity and/or high energy density.

The first positive active material may include a lithium nickel composite oxide (or a first nickel-based oxide) as a nickel-based positive active material. The nickel content (e.g., amount) in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 99.9 mol %, or less than or equal to about 99 mol % based on the total amount of transition metals other than lithium. For example, the nickel content (e.g., amount) in the lithium nickel composite oxide may be higher than the content (e.g., amount) of each of other metals such as cobalt, manganese, and aluminum. When the nickel content (e.g., amount) satisfies the above range, the positive active material may exhibit excellent or suitable battery performance while realizing a high capacity.

For example, the first positive active material may include a compound represented by Chemical Formula 1:

$Li_{a1}Ni_{x1}M^1_{y1}M^2_{1-x1-y1}O_2$.    Chemical Formula 1

In Chemical Formula 1, 0.9≤a1≤1.8, 0.3≤x1≤1, 0≤y1≤0.7, and $M^1$ and $M^2$ may each independently be selected from aluminum (Al), boron (B), cerium (Ce), cobalt (Co), chromium (Cr), fluorine (F), magnesium (Mg), manganese (Mn), molybdenum (Mo), niobium (Nb), phosphorus (P), sulfur (S), silicon (Si), strontium (Sr), titanium (Ti), vanadium (V), tungsten (W), zirconium (Zr), and combinations thereof.

The first positive active material may include, for example, a compound of Chemical Formula 2:

$Li_{a2}Ni_{x2}CO_{y2}M^3_{1-x2-y2}O_2$.    Chemical Formula 2

In Chemical Formula 2, 0.9≤a2≤1.8, 0.3≤x2≤1, 0≤y2≤0.7, and $M^3$ may be selected from Al, B, Ce, Cr, F, Mg, Mn, Mo, Nb, P, S, Si, Sr, Ti, V, W, Zr, and combinations thereof.

The first positive active material may include, for example, a compound of Chemical Formula 3:

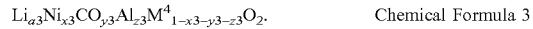

$Li_{a3}Ni_{x3}CO_{y3}Al_{z3}M^4_{1-x3-y3-z3}O_2$.    Chemical Formula 3

In Chemical Formula 3, 0.9≤a3≤1.8, 0.3≤x3≤1, 0≤y3≤0.7, 0≤z2≤0.4, and $M^4$ may be selected from B, Ce, Cr, F, Mg, Mn, Mo, Nb, P, S, Si, Sr, Ti, V, W, Zr, and combinations thereof.

In the positive active material according to an embodiment, the first positive active material may be included in an amount of about 50 wt % to about 90 wt %, and the second positive active material may be included in an amount of about 10 wt % to about 50 wt % based on the total amount of the first positive active material and the second positive active material. The first positive active material may be, for example, included in an amount of about 60 wt % to about 90 wt %, or about 70 wt % to about 90 wt %, and the second positive active material may be, for example, included in an amount of about 10 wt % to about 40 wt %, or about 10 wt % to about 30 wt %. When the content (e.g., amount) ratio of the first positive active material and the second positive active material is as described above, the positive active material including the same may exhibit high capacity, improved mixture density, and/or high energy density.

Second Positive Active Material

The second positive active material has a monolithic structure (which is also referred to as a single crystal form), wherein the term "single crystal form" refers to one single particle being present alone without any grain boundaries within (e.g., the single particle is a single crystal grain), and the term "monolithic structure" refers to particles that are not agglomerated with one another, and are instead present as an independent phase in terms of morphology, and thus may be expressed as a single crystal particle (e.g., as a primary particle that is not part of a secondary particle). The positive active material according to the embodiment may exhibit improved cycle-life characteristics while implementing high capacity and/or high energy density by including the second positive active material.

The second positive active material has no particular limit to a shape, and may have one or more suitable shapes (such as a polyhedron, an oval, a plate, a rod, an irregular shape, and/or the like).

The second positive active material according to an embodiment may be coated with cobalt (e.g., a cobalt-containing coating compound, in some embodiments, the same cobalt-containing coating compound as used on the first positive active material). For example, the surface of the second positive active material may be coated with the cobalt-containing compound. The second positive active material may include a single crystal and a cobalt coating layer on the surfaces of the single crystal. Because the second positive active material is coated with cobalt, structural collapse caused by repeated charges and discharges may be effectively suppressed or reduced, and room temperature and/or high temperature cycle-life characteristics may be improved.

A method of preparing the positive active material according to an embodiment (which is described later) may be performed by not separately coating the first positive active material and the second positive active material, but by coating the mixture together by mixing them (e.g., the first positive active material and the second positive active material) and then, concurrently (e.g., simultaneously) performing coating and firing on both in a third heat treatment. Accordingly, the second positive active material of the cobalt-coated single crystals may not have a smooth or flat surface, but an uneven surface with a plurality of protrusions and depressions. Accordingly, the surface roughness of the second positive active material may be increased, and a specific surface area thereof is also increased. The second positive active material according to an embodiment may have improved charge and discharge efficiency and/or cycle-life characteristics of a battery due to the increased surface roughness and specific surface area, compared with a single crystal positive active material coated with cobalt and/or the like.

The second positive active material according to an embodiment has protrusions and depressions on the surface, for example, linear protrusions and depressions (e.g., protrusions and depressions shaped like ridges and valleys, where in some embodiments an extending length of the protrusion or depressions is larger than its height and/or base width, and the extending length may be described as following a line), and/or atypical (e.g., non-linear) protrusions and depressions (e.g., protrusions and depressions not having the linear shape or another set or predetermined shape). For example, the cobalt-containing compound may be attached to the surface of the second positive active material of single crystals, for example, to form the linear and/or atypical protrusions and depressions, and may accordingly cover the surface of the single crystal (e.g., cover the outermost surface(s) of primary particles of the positive active material) in an uneven form. This coating shape or pattern is distinct from an island-type or kind coating.

This second positive active material exhibits high surface roughness. The surface roughness may be measured by utilizing an image taken with atomic force microscope (AFM) and/or the like, for example, an optical profiler. The term "maximum roughness" ($R_{max}$; peak to peak height; maximum roughness depth) may refer to a vertical distance between the highest peak and the lowest valley within a reference length of a roughness cross-section curve (roughness profile). The term "average roughness" ($R_a$) is interchangeably used with the term "center line average roughness", and may refer to an arithmetic average of the absolute values of ordinates (length from center to peak) within the reference length of the roughness profile. The term "root mean square roughness" ($R_q$) may refer to a root average square (rms) of vertical values within the reference length of the roughness profile. As for such surface roughness, parameters and measurement methods defined in KS B 0601 or ISO 4287/1 may be referred.

The maximum roughness ($R_{max}$; peak to peak height) of the surface of the second positive active material may be greater than or equal to about 15 nm, for example, greater than or equal to about 20 nm, or may be about 15 nm to about 100 nm, about 15 nm to about 50 nm, about 15 nm to about 40 nm, or about 20 nm. nm to about 35 nm. In this case, the positive active material for a rechargeable lithium battery including the second positive active material exhibits high energy density and/or high capacity, and may implement excellent or suitable charge/discharge efficiency and/or cycle-life characteristics.

An average roughness ($R_a$) of the surface of the second positive active material may be greater than or equal to about 1.5 nm, for example, greater than or equal to about 1.8 nm, about 1.5 nm to about 10 nm, about 1.5 nm to about 8.0 nm, about 1.5 nm to about 6.0 nm, about 1.8 nm to about 5.0 nm, about 2.0 nm to about 10 nm, or about 3.0 nm to about 10 nm. In this case, the positive active material for a rechargeable lithium battery including the second positive active material may exhibit high energy density and/or high capacity, and may implement excellent or suitable charge/discharge efficiency and/or cycle-life characteristics.

A root mean square roughness ($R_q$) of the surface of the second positive active material may be greater than or equal to about 2.0 nm, for example, greater than or equal to about 2.3 nm, and may be about 2.0 nm to about 10 nm, about 2.0 nm to about 8 nm, about 2.0 nm to about 6 nm, about 2.3 nm to about 5 nm, about 3.0 nm to about 10 nm, or about 4.0 nm to about 10 nm. In this case, the positive active material for a rechargeable lithium battery including the second positive active material exhibits high energy density and/or high capacity, and may implement excellent or suitable charge/discharge efficiency and/or cycle-life characteristics.

The BET specific surface area of the entire positive active material including the first positive active material and the second positive active material may be about 0.2 m²/g to about 0.6 m²/g, for example, about 0.3 m²/g to about 0.5 m²/g, or about 0.3 m²/g to about 0.4 m²/g. In this case, the positive active material may realize excellent or suitable charge/discharge efficiency and/or cycle-life characteristics.

The cobalt amount in the second positive active material may be about 0.01 mol % to about 7 mol %, for example, about 0.01 mol % to about 6 mol %, about 0.05 mol % to about 5 mol %, about 0.1 mol % to about 4 mol %, or about 0.5 mol % to about 3 mol %, and in addition (e.g., with respect to the concentration of cobalt atoms), about 0.01 atom % to about 7 atom %, about 0.1 atom % to about 5 atom %, or about 0.5 atom % to about 3 atom % based on the total amount of the second positive active material. In this case, the rechargeable lithium battery including the second positive active material may implement excellent or suitable room temperature and high temperature cycle-life characteristics.

The thickness of the cobalt coating layer in the second cathode active material may be about 1 nm to about 2 μm, for example, about 1 nm to about 1 μm, about 1 nm to about 900 nm, about 1 nm to about 700 nm, about 1 nm to about 500 nm, about 1 nm to about 300 nm, about 5 nm to about 100 nm, or about 5 nm to about 50 nm. In this case, the rechargeable lithium battery including the second positive active material may exhibit excellent or suitable room temperature and/or high temperature cycle-life characteristics.

The average particle diameter of the second positive active material, that is, the average particle diameter of the single crystal may be about 1 μm to about 10 μm, for example, about 1 μm to about 8 μm, about 2 μm to about 7 μm, about 2 μm to about 6 μm, about 2 μm to about 5 μm, or about 2 μm to about 4 μm. The particle diameter of the second positive active material may be the same as or smaller than that of the first positive active material, and thus the density of the positive active material may be further increased.

The second positive active material may include a lithium nickel-based composite oxide (or a second nickel-based oxide) as a nickel-based active material. The nickel content (e.g., amount) in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol %, and less than or equal to about 99.9 mol %, or less than or equal to about 99 mol % based on the total amount of transition metals other than lithium. For example, the nickel content (e.g., amount) in the lithium nickel composite oxide may be higher than each content (e.g., amount) of the other transition metals (such as cobalt, manganese, and/or aluminum). When the nickel content (e.g., amount) satisfies the above range, the positive active material may exhibit excellent or suitable battery performance while realizing a high capacity.

The second positive active material may include, for example, a compound represented by Chemical Formula 11:

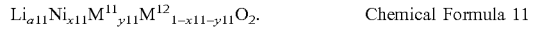  Chemical Formula 11

In Chemical Formula 11, $0.9 \le a11 \le 1.8$, $0.3 \le x11 \le 1$, $0 \le y11 \le 0.7$, and $M^{11}$ and $M^{12}$ may each independently be selected from Al, B, Ce, Co, Cr, F, Mg, Mn, Mo, Nb, P, S, Si, Sr, Ti, V, W, Zr, and combinations thereof.

In Chemical Formula 11, x11 representing the nickel content (e.g., amount) may be, for example, $0.4 \le x11 < 1$, $0.5 \le x11 < 1$, $0.6 \le x11 < 1$, $0.8 \le x11 < 1$, or $0.9 \le x11 < 1$. In this case, the positive active material including the same may implement a high capacity.

The second positive active material may be, for example, represented by Chemical Formula 12 or Chemical Formula 13:

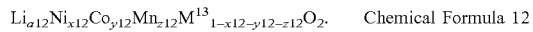  Chemical Formula 12

In Chemical Formula 12, $0.9 \le a12 \le 1.8$, $0.3 \le x12 < 1$, $0 < y12 < 0.7$, $0 < z12 < 0.7$, and $M^{13}$ may be selected from Al, B, Ce, Cr, F, Mg, Mo, Nb, P, S, Si, Sr, Ti, V, W, Zr, and combinations thereof.

  Chemical Formula 13

In Chemical Formula 13, $0.9 \le a13 \le 1.8$, $0.3 \le x13 < 1$, $0 < y13 \le 0.7$, and $M^{14}$ may be selected from B, Ce, Cr, F, Mg, Mn, Mo, Nb, P, S, Si, Sr, Ti, V, W, Zr, and combinations thereof.

When the second positive active material includes the compound represented by Chemical Formula 12 or Chemical Formula 13, the initial discharge capacity is not lowered while implementing a high capacity, and the effect of improving cycle-life characteristics can be obtained.

In Chemical Formula 12, x12, y12, and z12 may be, for example, in the ranges: $0.5 \le x12 < 1$, $0 < y12 < 0.5$, and $0 < z12 < 0.5$, $0.6 \le x12 < 1$, $0 < y12 < 0.4$, and $0 < z12 < 0.4$, or $0.8 \le x12 < 1$, $0 < y12 < 0.2$, and $0 < z12 < 0.2$. In Chemical Formula 13, x13 and y13 may be, for example, in the ranges: $0.5 \le x13 < 1$ and $0 < y13 \le 0.5$, $0.6 \le x13 < 1$ and $0 < y13 \le 0.4$, or $0.8 \le x13 \le 0.99$, $0.01 \le y13 \le 0.2$.

Method of Preparing Positive Active Material

In an embodiment, a method of preparing a positive active material for a rechargeable lithium battery includes: mixing a first nickel-based hydroxide and a lithium raw material and performing a first heat treatment to prepare a first nickel-based oxide, mixing a second nickel-based hydroxide and lithium raw material and performing a second heat treatment to prepare a second nickel-based oxide, and mixing the first nickel-based oxide, the second nickel-based oxide, and a cobalt compound and performing a third heat treatment to perform a cobalt coating, thereby obtaining a final (e.g., the) positive active material including the first positive active material and the second positive active material.

Herein, the first nickel-based oxide and first positive active material has a form of secondary particles formed by aggregation of a plurality of primary particles, wherein at least a portion of the primary particles have a radially arranged structure, and the second nickel-based oxide and second positive active material may have a monolithic structure (single crystal form). The first positive active material may be a material in which the first nickel-based oxide is coated with cobalt on the surface, and the second positive active material may be a material in which the second nickel-based oxide is coated with cobalt on the surface.

In an embodiment, the first positive active material and the second positive active material may be prepared by not individually coating the first nickel-based oxide and the second nickel-based oxide, but concurrently (e.g., simultaneously) coating them after first mixing them (e.g., mixing the two oxides). Accordingly, because the surface of the cobalt-coated single crystal second positive active material is not smooth and flat but uneven, the cobalt-coated single crystal second positive active material may have high surface roughness and specific surface area. Accordingly, a positive active material for a rechargeable lithium battery including this second positive active material may exhibit a high specific surface area and thus realize excellent or suitable capacity characteristics and/or cycle-life characteristics.

The first nickel-based hydroxide and the second nickel-based hydroxide are precursors of their respective positive active materials, and may each independently be a nickel hydroxide, a nickel-based composite hydroxide including an element other than (e.g., in addition to) nickel, or a nickel-transition element-composite hydroxide containing a transition metal other than nickel.

For example, the first nickel-based hydroxide and second nickel-based hydroxide may each independently be represented by Chemical Formula 21:

$$Ni_{x21}M^{21}_{y21}M^{22}_{1-x21-y21}(OH)_2.$$  Chemical Formula 21

In Chemical Formula 21, $0.3 \leq x21 \leq 1$, $0 \leq y21 \leq 0.7$, and $M^{21}$ and $M^{22}$ may each independently be selected from Al, B, Ce, Co, Cr, F, Mg, Mn, Mo, Nb, P, S, Si, Sr, Ti, V, W, Zr, and a combination thereof.

The first nickel-based hydroxide may have a particle diameter of about 10 μm to about 30 μm, for example, about 10 μm to about 25 μm, about 15 μm to about 25 μm, or about 10 μm to about 20 μm. The second nickel-based hydroxide may have a particle diameter of about 1 μm to about 9 μm, for example, about 2 μm to about 9 μm, about 2 μm to about 8 μm, or about 3 μm to about 7 μm.

The lithium raw material may be a lithium source for the positive active material and may include, for example, $Li_2CO_3$, LiOH, a hydrate thereof, or a combination thereof.

The first heat treatment may be performed under an oxidizing gas atmosphere, for example, under an oxygen atmosphere and/or an air atmosphere. In some embodiments, the first heat treatment may be performed at about 600° C. to about 900° C. or about 600° C. to about 800° C., for example, for about 5 hours to about 15 hours.

The second heat treatment also may be performed under an oxidizing gas atmosphere, for example, under an oxygen atmosphere and/or under an air atmosphere. In some embodiments, the second heat treatment may be performed, for example, at about 800° C. to about 1100° C., or about 900° C. to about 1000° C., for example, for about 5 hours to about 20 hours.

The second nickel-based oxide has a monolithic structure or a single crystal form, which may be obtained through adjustment of conditions such as a temperature, time, and/or the like of the second heat treatment or through various suitable conditions during synthesis of the second nickel-based hydroxide in a co-precipitation method.

The method of preparing a positive active material for a rechargeable lithium battery may further include pulverizing a product obtained after mixing and second heat-treating the second nickel-based hydroxide and the lithium raw material, thereby obtaining the single crystal second nickel-based oxide. The pulverization may be performed by utilizing one or more suitable pulverizing devices (such as a jet mill and/or the like).

When the second nickel-based hydroxide is mixed with the lithium raw material, a mole ratio of lithium in the lithium raw material relative to metal included in the second nickel-based hydroxide may be, for example, greater than or equal to about 0.8, greater than or equal to about 0.85, greater than or equal to about 0.9, greater than or equal to about 0.95, or greater than or equal to about 1.0 and less than or equal to about 1.8, less than or equal to about 1.5, less than or equal to about 1.2, less than or equal to about 1.1, or less than or equal to about 1.05.

When the first nickel-based oxide is mixed with the second nickel-based oxide, the first nickel-based oxide and the second nickel-based oxide may have a weight ratio of about 9:1 to about 5:5, for example, about 9:1 to about 6:4, or about 8:2 to about 7:3. When the first nickel-based oxide and the second nickel-based oxide are mixed within the aforementioned range, the obtained positive active material may exhibit high-capacity, high energy density, and/or high electrode plate density.

The mixture of the first nickel-based oxide and the second nickel-based oxide is cobalt-coated (e.g., coated with a cobalt-containing compound). The cobalt coating may be performed in a dry or wet method. In some embodiments, for example, the dry coating may be performed by third heat-treating the mixture after adding a cobalt compound to the mixture.

In some embodiments, the mixture may be mixed and washed with distilled water and/or the like (e.g., the mixture may be added to distilled water and/or a washing solvent), the cobalt compound is added thereto to perform wet coating, and then, the third heat treatment may be performed.

A cobalt coating amount (e.g., the amount of cobalt) may be about 0.01 parts by mole to about 7 parts by mole, or about 0.01 parts by mole to about 5 parts by mole, or about 0.1 parts by mole to about 3 parts by mole based on about 100 parts by mole of the transition elements of the active material. The cobalt compound (e.g., the cobalt-containing precursor utilized to form the cobalt coating) may be, for example, a cobalt sulfate salt, a cobalt oxide, a cobalt nitrate salt, etc.

The third heat treatment may be performed under an oxidizing gas atmosphere, and the oxidizing gas atmosphere may be an oxygen and/or air atmosphere. The third heat treatment may be performed, for example, about 650° C. to about 900° C. or about 650° C. to about 800° C. The third heat treatment may be performed for a suitable time duration depending on a heat treatment temperature and/or the like, for example, about 5 hours to about 30 hours, or about 10 hours to about 24 hours.

Subsequently, when the heat treatment is completed, the heat-treated product is cooled down to room temperature to obtain the aforementioned positive active material for a rechargeable lithium battery according to an embodiment. The prepared positive active material may be in a state in which the first positive active material including secondary particles formed of the agglomerated primary particles, where at least a portion of the primary particles are radially arranged, is mixed with the single crystal second positive active material, wherein the first and second positive active materials are respectively coated with cobalt, and protrusions and depressions are formed on the surface of the second positive active material.

Positive Electrode

A positive electrode for a rechargeable lithium battery may include a current collector and a positive active material layer on the current collector. The positive active material layer may include a positive active material, and may further include a binder and/or a conductive material.

The binder improves binding properties of positive active material particles with one another and with a current collector. Examples thereof may be or include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The content (e.g., amount) of the binder in the positive active material layer may be about 1 wt % to about 5 wt % based on the total weight of the positive active material layer.

The conductive material is included to provide electrode conductivity. Any electrically conductive material may be utilized as a conductive material unless it causes a chemical change. Examples of the conductive material may include a carbon-based material (such as natural graphite, artificial graphite, carbon black, acetylene black, ketjen black, a carbon fiber, carbon nanotube, and/or the like); a metal-based material of a metal powder or a metal fiber including copper, nickel, aluminum, silver, and/or the like; a conductive polymer (such as a polyphenylene derivative); and/or mixtures thereof.

The content (e.g., amount) of the conductive material in the positive active material layer may be about 1 wt % to about 5 wt % based on the total weight of the positive active material layer.

An aluminum foil may be utilized as the current collector, but is not limited thereto.

Negative Electrode

A negative electrode for a rechargeable lithium battery includes a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example, crystalline carbon, and/or amorphous carbon as a carbon-based negative active material. The crystalline carbon may be non-shaped (e.g., may be without a set or particular shape), or sheet, flake, spherical, and/or fiber shaped natural graphite and/or artificial graphite. The amorphous carbon may be a soft carbon, a hard carbon, a mesophase pitch carbonization product, calcined coke, and/or the like.

The lithium metal alloy includes an alloy of lithium and one or more metals selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative active material or a Sn-based negative active material. The Si-based negative active material may include silicon, a silicon-carbon composite, $SiO_x$ (0<x<2), a Si-Q alloy (wherein Q is an alkali metal, an alkaline-earth metal, a Group 13 element, a Group 14 element excluding Si, a Group 15 element, a Group 16 element, a transition metal, a rare earth element, or a combination thereof) and the Sn-based negative active material may include Sn, $SnO_2$, Sn—R alloy (wherein R is an alkali metal, an alkaline-earth metal, a Group 13 element, a Group 14 element excluding Sn, a Group 15 element, a Group 16 element, a transition metal, a rare earth element, or a combination thereof). At least one of these materials may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), and combinations thereof.

The silicon-carbon composite may be, for example, a silicon-carbon composite including a core including crystalline carbon and silicon particles and an amorphous carbon coating layer disposed on the surface of the core. The crystalline carbon may be or include artificial graphite, natural graphite, or a combination thereof. The amorphous carbon precursor may be a coal-based pitch, mesophase pitch, petroleum-based pitch, coal-based oil, petroleum-based heavy oil, and/or a polymer resin (such as a phenol resin, a furan resin, and/or a polyimide resin). In this case, the content (e.g., amount) of silicon may be about 10 wt % to about 50 wt % based on the total weight of the silicon-carbon composite. In some embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content (e.g., amount) ratio of Si:O in the silicon particles (indicating a degree of oxidation) may be a weight ratio of about 99:1 to about 33:66. The silicon particles may be $SiO_x$ particles, and in this case, the range of x in $SiO_x$ may be greater than about 0 and less than about 2. In the present specification, unless otherwise defined, an average particle diameter (D50) indicates a particle where an accumulated volume is about 50 volume % in a particle distribution.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In an embodiment, the negative active material layer further includes a binder, and may optionally further include a conductive material. The content (e.g., amount) of the binder in the negative active material layer may be about 1 wt % to about 5 wt % based on the total weight of the negative active material layer. In some embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to increase or improve adhesion of the negative active material particles to each other and also to adhere the negative active material to the current collector. The binder may be a water-insoluble binder, a water-soluble binder, or a combination thereof.

Examples of the water-insoluble binder may include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, and/or combinations thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resins, an acrylic resin, a phenol resin, an epoxy resin, polyvinyl alcohol, and combinations thereof.

When a water-soluble binder is utilized as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K or Li may be utilized. The amount of the thickener utilized may be about 0.1 parts by weight to about 3 parts by weight based on 100 parts by weight of the negative active material.

The conductive material is included to provide electrode conductivity. Any electrically conductive material may be utilized as a conductive material unless it causes a chemical change. Examples of the conductive material may include a carbon-based material (such as natural graphite, artificial graphite, carbon black, acetylene black, ketjen black, a carbon fiber, carbon nanotube, and/or the like); a metal-based material of a metal powder and/or a metal fiber including copper, nickel, aluminum silver, and/or the like; a conductive polymer (such as a polyphenylene derivative); and/or mixtures thereof.

The current collector may include one selected from a copper foil, a nickel foil, a stainless steel foil, a titanium foil, a nickel foam, a copper foam, a polymer substrate coated with a conductive metal, and combinations thereof.

Rechargeable Lithium Battery

Another embodiment provides a rechargeable lithium battery including a positive electrode, a negative electrode, a separator between the positive electrode and the positive electrode, and an electrolyte impregnated in the electrodes and separator. Here, the aforementioned electrode(s) may be the positive electrode and negative electrode.

Figure 4:
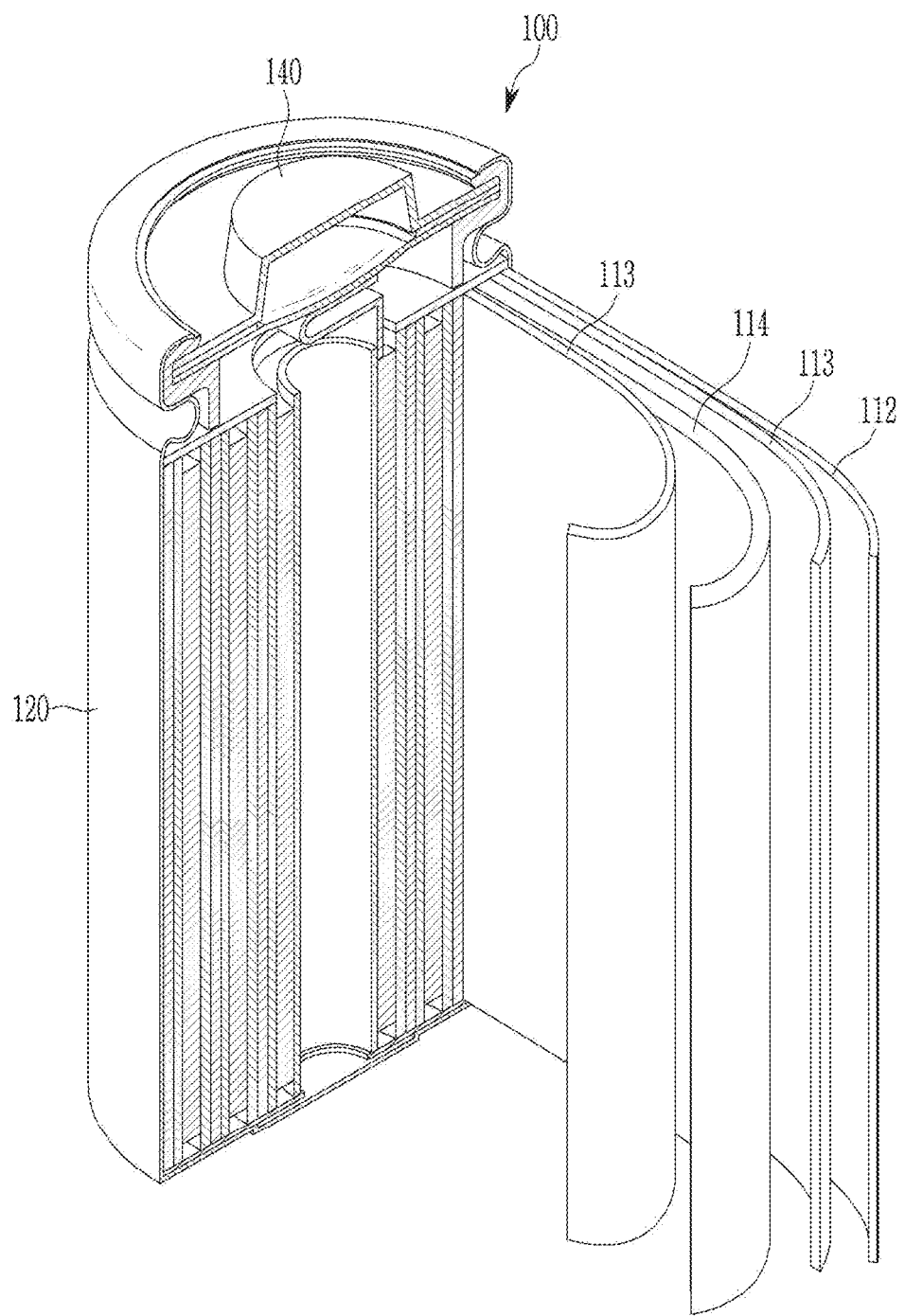
FIG. 4 is a schematic view illustrating a rechargeable lithium battery according to an embodiment.

FIG. 4 is a schematic view illustrating a rechargeable lithium battery according to an embodiment. Referring to FIG. 4, a rechargeable lithium battery 100 according to an embodiment includes a battery cell including a positive electrode 114, a negative electrode 112 facing the positive electrode 114, a separator 113 between the positive electrode 114 and the negative electrode 112, and an electrolyte for a rechargeable lithium battery impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like, and the ketone-based solvent may be cyclohexanone, and/or the like. In some embodiments, the alcohol-based solvent may be ethyl alcohol, isopropyl alcohol, etc., and the aprotic solvent may be or include nitriles (such as R—CN, where R is a C2 to C20 linear, branched, or cyclic hydrocarbon group and may include a double bond, an aromatic ring, or an ether bond), amides (such as dimethylformamide), dioxolanes (such as 1,3-dioxolane), sulfolanes, and/or the like.

The non-aqueous organic solvent may be utilized alone or in a mixture. When the organic solvent is utilized in a mixture, the mixture ratio may be controlled or selected in accordance with a desirable battery performance.

In some embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include vinylene carbonate and/or an ethylene carbonate-based compound in order to improve cycle-life of a battery.

Examples of the ethylene-based carbonate-based compound may be or include difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be utilized within an appropriate or suitable range.

The lithium salt dissolved in the non-organic solvent supplies lithium ions in a battery, enables basic operation of a rechargeable lithium battery, and improves transportation of the lithium ions between positive and negative electrodes.

Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide): LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example, an integer ranging from 1 to 20), lithium difluorobis(oxolato) phosphate, LiCl, LiI, $LiB(C_2O_4)_2$ (lithium bis(oxalato) borate, LiBOB), and/or lithium difluoro(oxalato)borate (LiDFOB).

The lithium salt may be utilized in a concentration ranging from about 0.1 M to about 2.0 M. When the lithium salt is included at the above concentration range, an electrolyte may have excellent or suitable performance and/or lithium ion mobility due to optimal or suitable electrolyte conductivity and viscosity.

The separator 113 separates a positive electrode 114 and a negative electrode 112, provides a transporting passage for lithium ions, and may be any generally-used separator in a lithium ion battery. In other words, it may have low resistance to ion transport and excellent or suitable electrolyte impregnation. For example, the separator may be selected from a glass fiber, polyester, polyethylene, polypropylene, polytetrafluoroethylene (PTFE) or TEFLON®, or a combination thereof. It may have a form of a non-woven fabric or a woven fabric. For example, in a lithium ion battery, a polyolefin-based polymer separator (such as polyethylene and/or polypropylene) is mainly utilized. In order to ensure the heat resistance and/or mechanical strength, a coated separator including a ceramic component and/or a polymer material may be utilized. The separator may have a mono-layered or multi-layered structure.

Rechargeable lithium batteries may be classified as lithium ion batteries, lithium ion polymer batteries, and lithium polymer batteries according to the presence of a separator and the kind of electrolyte utilized therein. The rechargeable lithium batteries may have a variety of shapes and sizes, and include cylindrical, prismatic, coin, or pouch-type or format batteries, and may be thin film batteries or may be rather bulky in size. Suitable structures and manufacturing methods for lithium ion batteries pertaining to this disclosure are well known in the art.

The rechargeable lithium battery according to an embodiment may be utilized in an electric vehicle (EV), a hybrid electric vehicle (such as a plug-in hybrid electric vehicle (PHEV)), and/or portable electronic devices because it implements a high capacity and has excellent or suitable storage stability, cycle-life characteristics, and/or high rate characteristics at high temperatures.

Hereinafter, examples of the present disclosure and comparative examples are described. It is to be understood, however, that the examples are for the purpose of illustration and are not to be construed as limiting the present disclosure.

Example 1

1. Preparation of First Nickel-Based Oxide in the Form of Radial Secondary Particles First, a first nickel-based hydroxide ($Ni_{0.95}Co_{0.04}Mn_{0.01}OH$) is synthesized through a co-precipitation method. Nickel sulfate, cobalt sulfate, and manganese sulfate are utilized as metal raw materials.

First Step: 2.5 $kW/m^3$, $NH_4OH$ 0.40 M, pH 10.5 to 11.5, and Reaction Time of 6 Hours First, ammonia water having a concentration of 0.40 M is put in a reactor. The metal raw materials and a complex (e.g., complexing) agent are added thereto respectively at 85 mL/min and 10 mL/min at 50° C. under a stirring power of 2.5 $kW/m^3$ and a reaction is started. NaOH is added thereto to maintain pH, and the reaction is performed for 6 hours. Core particles obtained as a reaction result had an average size (diameter) of about 6.5 μm to 7.5 μm and then, a second step is performed as follows.

Second Step: 2.0 $kW/m^3$, $NH_4OH$ 0.45 M, pH 11 to 12, and Reaction Time of 18 Hours The metal raw materials and the complex agent are added to the reaction mixture respectively at 85 mL/min and 12 mL/min, while the reaction temperature is maintained at 50° C., so that the complex agent is maintained at a concentration of 0.45 M. While adding NaOH thereto in order to maintain pH, the reaction is performed for 6 hours. Herein, the reaction is performed by lowering the stirring power by 2.0 $kW/m^3$ than that of the first step. Particles having a core and an intermediate layer produced from this reaction had an average size of 13.5 μm to 14 μm, and then, a third step is performed as follows.

Third Step: 1.5 $kW/m^3$, $NH_4OH$ 0.45 M, pH 10.5 to 11.5, and Reaction Time of 14 Hours While maintaining the reaction temperature of 50° C., the input rate of the metal raw material and the complexing agent and the concentration of the complexing agent are the same as in second step. While adding NaOH thereto in order to maintain pH, the reaction is performed for 14 hours. At this time, the stirring power is lowered to 1.5 $kW/m^3$, which is lower than the second step, and the reaction proceeds.

Post Process

After washing the obtained product, hot air drying is performed at about 150° C. for 24 hours to obtain a first nickel-based hydroxide ($Ni_{0.95}Co_{0.04}Mn_{0.01}OH$).

Oxidation Process

The obtained first nickel-based hydroxide is mixed with LiOH so that a mole ratio of lithium is 1.04 based on the total amount of transition elements of the first nickel-based hydroxide and then, primarily (e.g., first) heat-treated at about 750° C. for 15 hours under an oxygen atmosphere, obtaining a first nickel-based oxide ($LiNi_{0.95}Co_{0.04}Mn_{0.01}O_2$). The obtained first nickel-based oxide has an average particle diameter of about 13.8 μm and a secondary particle form in which at least a portion of primary particles has a radial arrangement structure.

2. Preparation of Second Nickel-Based Oxide Having Monolithic Structure Co-Precipitation Process Nickel sulfate ($NiSO_4 \cdot 6H_2O$), cobalt sulfate ($CoSO_4 \cdot 7H_2O$), and manganese sulfate ($MnSO_4 \cdot H_2O$) are dissolved in distilled water as a solvent, preparing a mixed solution. In order to form a complex, diluted ammonia water ($NH_4OH$) and sodium hydroxide (NaOH) as a precipitant are prepared. Subsequently, the raw metal material mixed solution, the ammonia water, and the sodium hydroxide are each put into a reactor. While stirred, the reaction proceeds for about 20 hours. Subsequently, the slurry solution in the reactor is filtered, washed with distilled water with high purity, and dried for 24 hours, obtaining a second nickel-based hydroxide ($Ni_{0.94}Co_{0.05}Mn_{0.01}(OH)_2$) powder. The obtained second nickel-based hydroxide powder has an average particle diameter of about 4.0 μm and a specific surface area of about 15 $m^2/g$, which is measured in a BET method.

Oxidation Process

The obtained second nickel-based hydroxide is mixed with LiOH to satisfy Li/(Ni+Co+Mn)=1.05 and put in a furnace and then, second heat-treated at 910° C. for 8 hours under an oxygen atmosphere, obtaining a second nickel-based oxide ($LiNi_{0.94}Co_{0.05}Mn_{0.01}O_2$). Subsequently, the obtained second nickel-based oxide is pulverized for about 30 minutes and then, separated/dispersed into a plurality of second nickel-based oxide particles, each having a monolithic structure. The second nickel-based oxide with the monolithic structure has an average particle diameter of about 3.7 μm.

3. Cobalt Coating and Preparation of Final Positive Active Material

The first nickel-based oxide and the second nickel-based oxide are mixed in a weight ratio of 7:3, and this mixture is washed in a weight ratio of 1:1 with water in a stirrer and dried at 150° C. Herein, 5 parts by mole of lithium hydroxide and 3 parts by mole of cobalt oxide based on 100 parts by mole of transition elements of the nickel-based oxides are added and mixed therewith and then, put in a furnace and third heat-treated at about 700° C. for 15 hours under an oxygen atmosphere. Subsequently, the furnace is cooled down to room temperature, obtaining a final positive active material in which the first positive active material and the second positive active material are mixed.

The final positive active material is a mixture of (a) the first positive active material in a secondary particle form in which at least a portion of the primary particles are radially disposed, and (b) the second positive active material in a monolith form, which are both coated with cobalt (e.g., a cobalt-containing compound).

Figure 5:
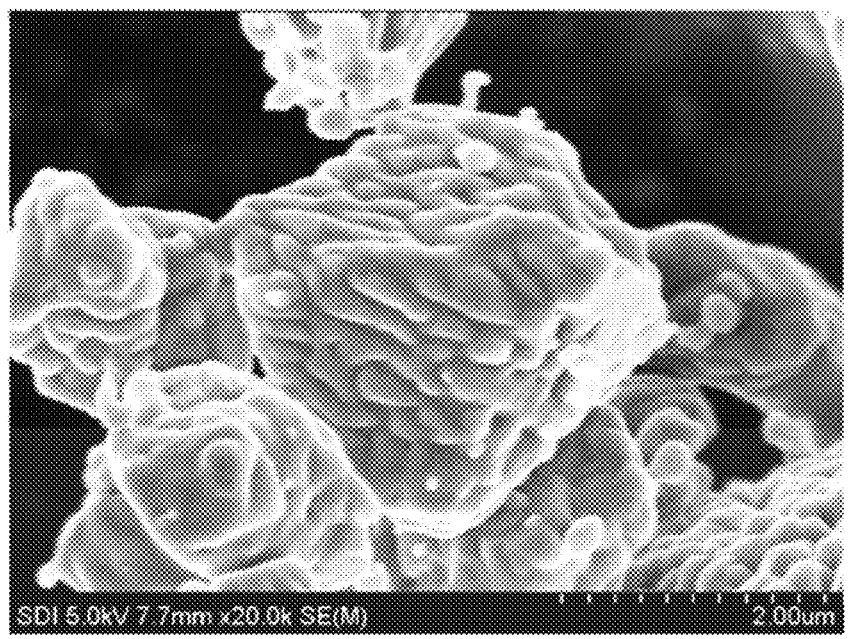
FIG. 5 is a scanning electron microscopic (SEM) image of the second positive active material of Example 1.

FIG. 5 is a scanning electron microscopic image of the second positive active material prepared according to Example 1. Referring to FIG. 5, protrusions and depressions are formed on the surface of the second positive active material with a monolithic structure.

4. Manufacture of Positive Electrode 95 wt % of the final positive active material, 3 wt % of a polyvinylidene fluoride binder, and 2 wt % of carbon nanotube conductive material are mixed in an N-methylpyrrolidone solvent to prepare positive active material slurry. The positive active material slurry is applied to an aluminum current collector, dried, and then compressed to manufacture a positive electrode.

5. Manufacture of Rechargeable Lithium Battery Cell

A coin half-cell is manufactured by disposing a separator having a polyethylene/polypropylene multilayer structure between the manufactured positive electrode and a lithium metal counter electrode, and injecting an electrolyte solution (in which 1.0 M $LiPF_6$ lithium salt was added to a solvent in which ethylene carbonate and diethyl carbonate are mixed in a volume ratio of 50:50).

Example 2

A positive active material, a positive electrode, and a cell are manufactured according to substantially the same method as Example 1, except that the cobalt coating is performed utilizing a wet method in place of the dry method described in "3. cobalt coating and preparation of a final positive active material" of Example 1. The cobalt coating process is as follows. The first nickel-based oxide and the second nickel-based oxide are mixed in a weight ratio of 7:3 and then, put in distilled water and washed therewith, while mixed. Subsequently, 3 parts by mole of cobalt sulfate ($CoSO_4$) based on 100 parts by mole of transition elements of the nickel-based oxides is slowly added thereto to perform cobalt coating. Sodium hydroxide (NaOH) is slowly added thereto. Then, a product obtained therefrom is dried at 150° C. for 12 hours. The dried material is put in a furnace and third heat-treated at about 700° C. for 15 hours under an oxygen atmosphere. Subsequently, the furnace is cooled down to room temperature, obtaining a final positive active material in which the first and second positive active materials are mixed. In the final positive active material, the second positive active material having a monolithic structure has protrusions and depressions formed on the surface and an average particle diameter of about 4 μm.

Comparative Example 1

A positive active material, a positive electrode, and a cell are manufactured according to substantially the same method as Example 1, except that the first nickel-based oxide and the second nickel-based oxide are not mixed first and coated together, but are individually coated and then mixed in in place of the act described in "3. cobalt coating and preparation of a final positive active material" of Example 1. The cobalt coating proceeds as follows. 5 parts by mole of lithium hydroxide and 3 parts by mole of cobalt oxide based on 100 parts by mole of transition elements are mixed with the first nickel-based oxide and then, put in a furnace and third heat-treated at about 700° C. for 15 hours under an oxygen atmosphere and then, cooled down to room temperature, obtaining a first positive active material. 5 parts by mole of lithium hydroxide and 3 parts by mole of cobalt oxide based on 100 parts by mole of transition elements are mixed with the second nickel-based oxide and then, put in a furnace and third heat-treated at about 850° C. for 15 hours under an oxygen atmosphere and then, cooled down to room temperature, obtaining a second positive active material. The cobalt-coated first positive active material and the cobalt-coated second positive active material are mixed in a weight ratio of 7:3, preparing a final positive active material according to Comparative Example 1.

Figure 6:
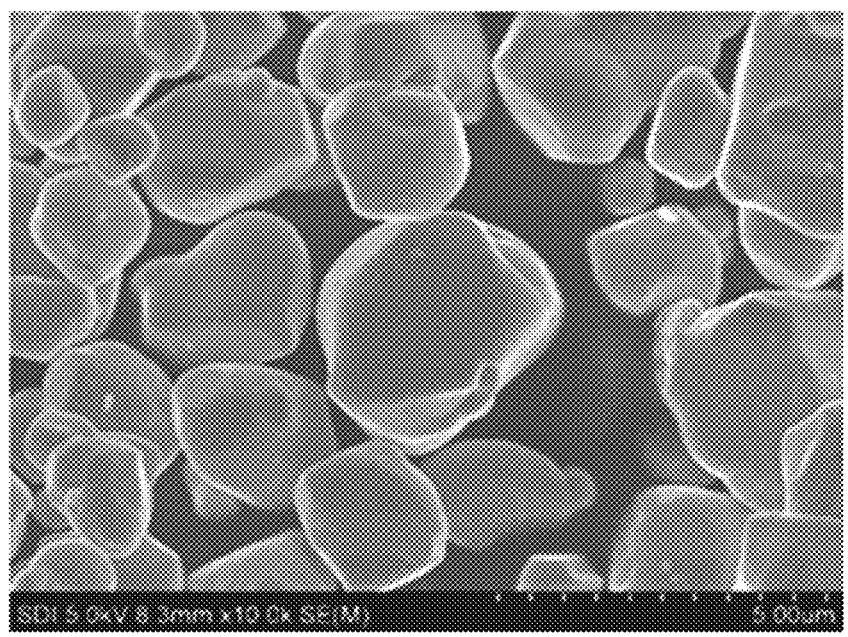
FIG. 6 is a scanning electron microscopic image of the second positive active material of Comparative Example 1.

FIG. 6 is a scanning electron microscopic image of the second positive active material prepared according to Comparative Example 1. Referring to FIG. 6, the surface of the second positive active material of Comparative Example 1 has no protrusions and depressions on the surface, and is instead substantially or comparatively smooth and flat.

Comparative Example 2

A positive active material, a positive electrode and a cell are manufactured according to substantially the same method as Comparative Example 1 except that the third heat treatment of the second nickel-based oxide is performed at about 700° C. for 15 hours under an oxygen atmosphere.

Figure 7:
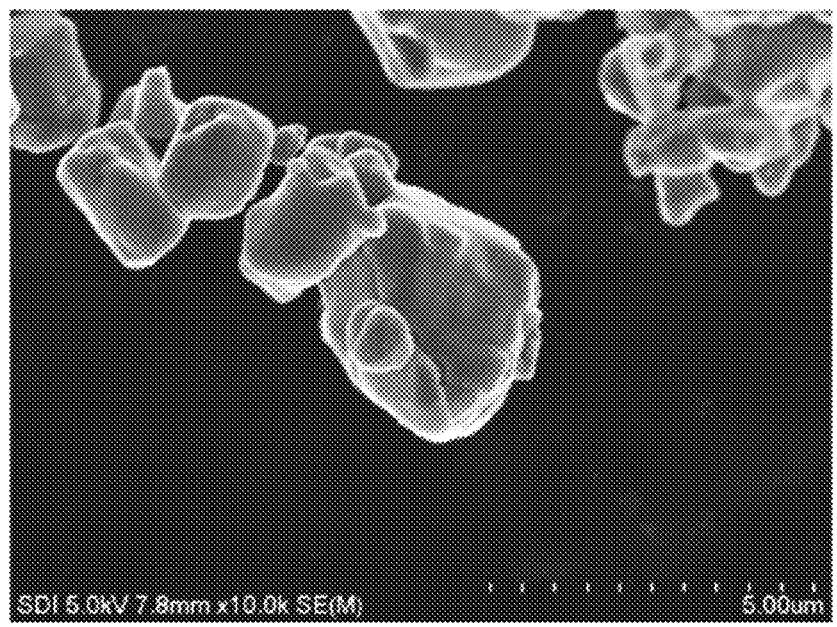
FIG. 7 is a scanning electron microscopic image of the second positive active material of Comparative Example 2.

FIG. 7 is a scanning electron microscopic image of the second positive active material prepared according to Comparative Example 2. Referring to FIG. 7, the surface of the second positive active material of Comparative Example 2 has no protrusions and depressions, and is instead substantially or comparatively smooth and flat.

Evaluation Example 1: Evaluation of Surface Roughness of Second Positive Active Material The positive active materials according to Examples 1 and 2 and Comparative Examples 1 and 2 are measured with respect to surface roughness of the second positive active materials through a surface roughness meter utilizing atomic force microscopy (scan speed: 0.25 μm/s, non-contact mode range: 250 nm×250 nm, DME UHV AFM). The results are shown in Table 1.

TABLE 1

|  | Example 1 | Example 2 | Comparative Example 1 | Comparative Example 2 |
|---|---|---|---|---|
| Maximum roughness ($R_{max}$; peak to peak height) (nm) | 28 | 25.7 | 7.4 | 9.6 |
| Average roughness ($R_a$) (nm) | 2.60 | 2.20 | 0.77 | 0.94 |
| Root mean square roughness ($R_q$) (nm) | 2.7 | 2.9 | 0.91 | 1.1 |

Referring to Table 1, the second positive active materials of the examples exhibit high maximum roughness, average roughness, and root mean square roughness, compared with the second positive active material of the comparative examples.

Evaluation Example 2: Evaluation of Specific Surface Area

The positive active materials of Examples 1 and 2 and Comparative Examples 1 and 2 are measured with respect to a specific surface area, and the results are shown in Table 2. The specific surface area is measured by utilizing a physical and chemical adsorption phenomenon and a Brunauer-Emmett-Teller (BET) method. In other words, after measuring weights of the active materials, nitrogen is absorbed on the surface of the active materials, and an amount of the absorbed nitrogen gas is measured and utilized to obtain the specific surface area by utilizing the BET method.

TABLE 2

|  | BET specific surface area (m²/g) |
|---|---|
| Example 1 | 0.4070 |
| Example 2 | 0.4028 |
| Comparative Example 1 | 0.2792 |
| Comparative Example 2 | 0.2709 |

Referring to Table 2, the positive active materials including the first and second positive active materials according to Examples 1 and 2 exhibit an increased specific surface area, compared with the positive active materials of the comparative examples.

Evaluation Example 3: Charging/Discharging Efficiency and Cycle-Life Characteristics The coin half cells of Examples 1 and 2 and Comparative Examples 1 and 2 are respectively charged under constant current (0.2C) and constant voltage (4.25 V, 0.05C cut-off) conditions to measure charge capacity, paused for 10 minutes, and then discharged down to 3.0 V under a constant current (0.2C) condition to measure discharge capacity. A ratio of the discharge capacity relative to the charge capacity is reported as the cell efficiency. The results are shown in Table 3.

The cells are initially charged and discharged, and then 50 times charged and discharged at 1C at 45° C. to measure the 50$^{th}$ discharge capacity, and a ratio (%) of the 50$^{th}$ discharge capacity relative to the initial discharge capacity is expressed as capacity retention, that is, cycle-life characteristics in Table 3.

TABLE 3

|  | Charge capacity (mAh/g) | Discharge capacity (mAh/g) | Efficiency (%) | 50th cycle capacity retention (%) |
|---|---|---|---|---|
| Example 1 | 237.3 | 213.3 | 89.9 | 96.7 |
| Example 2 | 238.7 | 212.7 | 89.1 | 97.1 |
| Comparative Example 1 | 235.8 | 204.0 | 86.5 | 94.6 |
| Comparative Example 2 | 233.9 | 200.9 | 85.9 | 94.4 |

Referring to Table 3, Examples 1 and 2 exhibited increased discharge and improved charge and discharge efficiency and also, improved high temperature cycle-life characteristics, compared with Comparative Examples 1 and 2 (in which the first and second positive active materials are separately cobalt-coated and fired).

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the present disclosure is not limited to the disclosed embodiments. On the contrary, it is intended to cover various suitable modifications and equivalent arrangements included within the spirit and scope of the appended claims and equivalents thereof.

| Description of Some of the Symbols | |
|---|---|
| 11: | secondary particle |
| 12: | internal portion of secondary particle |
| 13: | primary particle |
| 14: | external portion of secondary particle |
| 100: | rechargeable lithium battery |
| 112: | positive electrode |
| 113: | separator |

| Description of Some of the Symbols | |
|---|---|
| 114: | positive electrode |
| 120: | battery case |
| 140: | sealing member |

What is claimed is:

1. A positive active material for a rechargeable lithium battery, the positive active material comprising:
a first positive active material in a form of secondary particles in which a plurality of primary particles are aggregated,
wherein at least a portion of the primary particles have a radially arranged structure; and
a second positive active material having a monolithic structure,
wherein both the first positive active material and the second positive active material are nickel-based positive active materials,
each of the first positive active material and the second positive active material is coated with cobalt, and
a maximum roughness ($R_{max}$; peak to peak height) of the second positive active material surface is greater than or equal to about 15 nm.

2. The positive active material of claim 1, wherein:
an average roughness ($R_a$) of the surface of the second positive active material is greater than or equal to about 1.5 nm, and
a root mean square roughness ($R_q$) of the surface of the second positive active material is greater than or equal to about 2.0 nm.

3. The positive active material of claim 1, wherein a BET specific surface area of the positive active material comprising the first positive active material and the second positive active material is about 0.3 m$^2$/g to about 0.6 m$^2$/g.

4. The positive active material of claim 1, wherein the second positive active material has protrusions and depressions on the surface.

5. The positive active material of claim 1, wherein:
an average particle diameter of the secondary particles of the first positive active material is about 7 μm to about 25 μm, and
an average particle diameter of the second positive active material is about 1 μm to about 10 μm.

6. The positive active material of claim 1, wherein:
in the first positive active material, the primary particles have a plate shape, and at least some of the primary particles have a long axis arranged in a radial direction, and
an average length of the primary particles is about 0.01 μm to about 5 μm.

7. The positive active material of claim 1, wherein:
the first positive active material is comprised in an amount of about 50 wt % to about 90 wt % based on a total amount of the first positive active material and the second positive active material, and
the second positive active material is comprised in an amount of about 10 wt % to about 50 wt % based on a total amount of the first positive active material and the second positive active material.

8. The positive active material of claim 1, wherein:
the first positive active material comprises a compound represented by Chemical Formula 1, and
the second positive active material comprises a compound represented by Chemical Formula 11:

$$Li_{a1}Ni_{x1}M^1_{y1}M^2_{1-x1-y1}O_2 \quad \text{Chemical Formula 1}$$

wherein, in Chemical Formula 1, 0.9≤a1≤1.8, 0.3≤x1≤1, 0≤y1≤0.7, and M$^1$ and M$^2$ are each independently selected from Al, B, Ce, Co, Cr, F, Mg, Mn, Mo, Nb, P, S, Si, Sr, Ti, V, W, Zr, and a combination thereof, and $$Li_{a11}Ni_{x11}M^{11}_{y11}M^{12}_{1-x11-y11}O_2 \quad \text{Chemical Formula 11}$$

wherein, in Chemical Formula 11, 0.9≤a11≤1.8, 0.3≤x11≤1, 0≤y11≤0.7, and M$^{11}$ and M$^{12}$ are each independently selected from Al, B, Ce, Co, Cr, F, Mg, Mn, Mo, Nb, P, S, Si, Sr, Ti, V, W, Zr, and combinations thereof.

9. A rechargeable lithium battery comprising:
a positive electrode comprising the positive active material of claim 1, a negative electrode, and an electrolyte.

* * * * *